(12) United States Patent
Collura et al.

(10) Patent No.: US 8,392,490 B2
(45) Date of Patent: Mar. 5, 2013

(54) IDENTIFYING DECIMAL FLOATING POINT ADDITION OPERATIONS THAT DO NOT REQUIRE ALIGNMENT, NORMALIZATION OR ROUNDING

(75) Inventors: Adam B. Collura, Hyde Park, NY (US); Steven R. Carlough, Poughkeepsie, NY (US); Wen He Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 12/032,858

(22) Filed: Feb. 18, 2008

(65) Prior Publication Data

US 2009/0210472 A1 Aug. 20, 2009

(51) Int. Cl.
*G06F 7/00* (2006.01)
*G06F 15/00* (2006.01)

(52) U.S. Cl. ......... 708/205; 708/209; 708/496; 708/513
(58) Field of Classification Search ................. 708/250, 708/205

See application file for complete search history.

(56) References Cited

U.S. PATENT DOCUMENTS

| | | | | |
|---|---|---|---|---|
| 4,562,553 A * | 12/1985 | Mattedi et al. | ............... | 708/497 |
| 5,010,508 A * | 4/1991 | Sit et al. | ........................ | 708/505 |
| 5,136,536 A | 8/1992 | Ng | | |
| 5,337,265 A * | 8/1994 | Desrosiers et al. | ........... | 708/505 |
| 6,018,756 A | 1/2000 | Wolrich et al. | | |
| 6,148,316 A | 11/2000 | Herbert et al. | | |
| 2003/0115236 A1 | 6/2003 | Naini et al. | | |
| 2006/0179099 A1 * | 8/2006 | Carlough et al. | ............ | 708/495 |
| 2007/0050436 A1 * | 3/2007 | Chen et al. | .................... | 708/204 |

OTHER PUBLICATIONS

H. Q. Le et al., IBM POWER6 microarchitecture, Nov. 2007, IBM J. Res. & Dev., vol. 51 No. 6, pp. 639-661.*
Wang et al., Decimal Floating-Point and Multifuinction Unit with Injection-Based Rounding, 18th IEEE Symposium on Computer Arithmetic, 2007, pp. 1-10.*
IEEE Standard for Binary Floating-Point Arithmetic (ANSI/IEEE Std 754-1985), Institute of Electrical and Electronics Engineers ; Published Date: Oct. 12, 1985. 20 pages.
"IBM® z/Architecture Principles of Operation", Publication No. SA22-7832-05, 6th Edition, Apr. 2007. 1,215 pages separated into 4 electronic attachments.

* cited by examiner

*Primary Examiner* — Chat Do
*Assistant Examiner* — Kevin G Hughes
(74) *Attorney, Agent, or Firm* — Cantor Colburn LLP; John Campbell

(57) ABSTRACT

A method, computer program product and a system for identifying decimal floating point addition operations that guarantee operand alignment and do not require alignment, normalization or rounding are provided. The method includes: receiving an instruction to perform an addition of a first operand and a second operand; extracting a first exponent (EXP) and a first most significant digit (MSD) from the first operand; extracting a second EXP and a second MSD from the second operand; and determining whether alignment between the first operand and the second operand is guaranteed, based on the first EXP, the first MSD, the second EXP and the second MSD.

14 Claims, 3 Drawing Sheets

IDENTIFYING DECIMAL FLOATING POINT ADDITION OPERATIONS THAT DO NOT REQUIRE ALIGNMENT, NORMALIZATION OR ROUNDING

BACKGROUND OF THE INVENTION

This invention relates generally to microprocessing, and more particularly to providing methods to improve floating point arithmetic operations.

When performing decimal floating point addition, alignment of none, one or both operands must be performed to account for a difference in exponent magnitude. Given that the addition is performed on two numbers with a precision of "p" digits, the resultant sum must also be contained within p digits. Normalization of the resultant sum may be needed if the infinitely precise result exceeds p digits. Alignment of the operands or normalization of the result may be needed depending on the values of the operand's exponents or of the infinitely precise sum.

When two such real decimal floating point numbers are added, they fall into one of three categories. In a first category, the exponents of each operand are equal, and no operand alignment is needed. In a second category, the exponents of each operand are unequal, and alignment of only the operand having the larger exponent is necessary.

In a third category, the exponents of each operand are unequal, and alignment of both operands is necessary. Alignment is required to normalize (i.e., shift left such that the most significant digit is not zero) the operand with the larger exponent, and the other operand is shifted right by a number "n" of digits. The number of digits n by which the other operand is shifted is represented by the equation:

$$n = d - z$$

where "d" is the exponent difference between the operands and "z" is the original number of leading zeroes of the operand having the larger exponent.

In designing a unit which would execute decimal floating point addition instructions in hardware, one must determine to which category the addition operation belongs. The first category, where the operand exponents are equal, is generally the most common. For example, when applied to business transactions, the niche for decimal floating point numbers, one typically adds dollars to dollars, not necessarily dollars to cents. Such "dollar to dollar" operations fall into the first category.

However, while the majority of the first category scenarios are easily determined, there are certain cases which require additional normalization and rounding steps, despite the fact that the operand's exponents are equivalent. Additional steps in a decimal floating point addition operation are thus required to ensure that the operation does not fall into one of these cases. Such additional steps increase the latency and decrease the performance of this most common operation.

The IEEE 754 standard allows for a consistent and uniform way to represent decimal floating point numbers, by breaking down a number into a sign field, an exponent field and a coefficient field.

Decimal floating point numbers may also be represented using the decimal floating point format as specified, e.g., in Chapter 20 of "IBM® z/Architecture Principles of Operation," Publication No. SA22-7832-05, 6th Edition, April 2007, which is hereby incorporated herein by reference in its entirety. This format breaks down a number into a sign digit (S), a combination field (CF), a biased exponent continuation field (BXCF), and a coefficient continuation field (CCF).

Because the exponents of decimal floating point numbers are consistently in the same bit positions, one can extract the exponent of an operand and determine whether an additive operation falls into the first category; if the difference between the exponents is zero, then the operation is in the first category.

Such a method to determine whether an operation falls into the first category suffices for most additive operations and avails itself to trivial hardware implementation; the magnitude of both operations are summed together, and the exponent remains the same. However, there exist cases where, despite the fact that the exponents are equivalent, the addition would cause a carry-out from the prescribed precision. Such an event would require additional hardware checking and adjustments to normalize the resultant magnitude to within the prescribed precision and adjust the exponent by a value of one.

Knowing which addition category the operation belongs to may also be relevant in the event that an external dispatch unit is involved in the design of a microprocessor. If the category is known early in the execution of an addition instruction, then a preemptive signal can be generated to tell the dispatch unit when to issue the next instruction. This is critical to ensure that designs operate close to maximum capacity. For example, knowledge that an additive operation is in the first category will allow the dispatch of the next instruction sooner, thereby increasing performance.

Thus, it would be desirable to be able to reduce the number of checking and normalization steps required in decimal floating point decimal addition. Such a reduction would allow for increased performance, especially for the most common cases.

BRIEF SUMMARY OF THE INVENTION

An exemplary embodiment includes a method of identifying decimal floating point addition operations that guarantee operand alignment and do not require alignment, normalization or rounding. The method includes: receiving an instruction to perform an addition of a first operand and a second operand; extracting a first exponent (EXP) and a first most significant digit (MSD) from the first operand; extracting a second EXP and a second MSD from the second operand; and determining whether alignment between the first operand and the second operand is guaranteed, based on the first EXP, the first MSD, the second EXP and the second MSD.

Another exemplary embodiment includes a computer program product for identifying floating point addition operations that guarantee operand alignment and do not require alignment, normalization or rounding. The computer program product includes a computer-readable storage medium for storing instructions for executing a method. The method includes: receiving an instruction to perform an addition of a first operand and a second operand; extracting a first exponent (EXP) and a first most significant digit (MSD) from the first operand; extracting a second EXP and a second MSD from the second operand; and determining whether alignment between the first operand and the second operand is guaranteed, based on the first EXP, the first MSD, the second EXP and the second MSD.

A further exemplary embodiment includes a system for identifying floating point addition operations that guarantee operand alignment and do not require alignment, normalization or rounding. The system includes an instruction dispatching unit (IDU) for sending an instruction to perform an addition of a first operand and a second operand; and a processor in operable communication with the IDU. The processor performs: receiving the instruction; extracting a first exponent (EXP) and a first most significant digit (MSD) from the first operand; extracting a second EXP and a second MSD from the second operand; and determining whether alignment between the first operand and the second operand is guaranteed, based on the first EXP, the first MSD, the second EXP and the second MSD.

BRIEF DESCRIPTION OF THE DRAWINGS

Referring now to the drawings wherein like elements are numbered alike in the FIGURE.

DETAILED DESCRIPTION OF EXEMPLARY EMBODIMENTS

An exemplary embodiment of the present invention provides a method for identifying decimal floating point addition operations that guarantee operand alignment, and in addition, do not require result normalization and/or rounding. Identification is accomplished through examination of an operand's exponents and most significant decimal digits. The method includes adding an additional piece of data to indicate, if applicable, that additional checking or normalization steps would not be required.

In one embodiment, the method is performed on numerical data having a format provided by Chapter 20 of the IBM zArchitecture Principles of Operation. However, although the method is described in conjunction with the IBM zArchitecture Principles of Operation format, the method may be used in conjunction with other suitable formats or standards, such as the IEEE 754 standard format.

In one embodiment, each operand is a number 100 that includes a sign digit (S) 102, a combination field (CF) 104, a biased exponent continuation field (BXCF) 106, and a coefficient continuation field (CCF) 108.

The method utilizes data contained within the CF 106 and the BXCF 108 of each number 100. Data in these two fields provides the biased exponent value and the most significant digit (MSD) of the coefficient.

To guarantee that no additional normalization and rounding steps would be required by hardware, the most significant digit is used to determine if the summation of the operands could produce a value whose precision is greater than p digits, the prescribed precision of the result. If the sum of the most significant digits from both operands is less than nine (9), then it is guaranteed that the operands are in alignment, the operands are normalized and that there is no overflow. Thus, no post-normalization, alignment or rounding would be necessary. This is known since a most significant digit sum of less than nine (9) would not propagate previous digit carries into an overflow condition with the result being p+1 digits, nor would the summation generate a carry, which too, could produce the same overflow condition.

Figure 1:
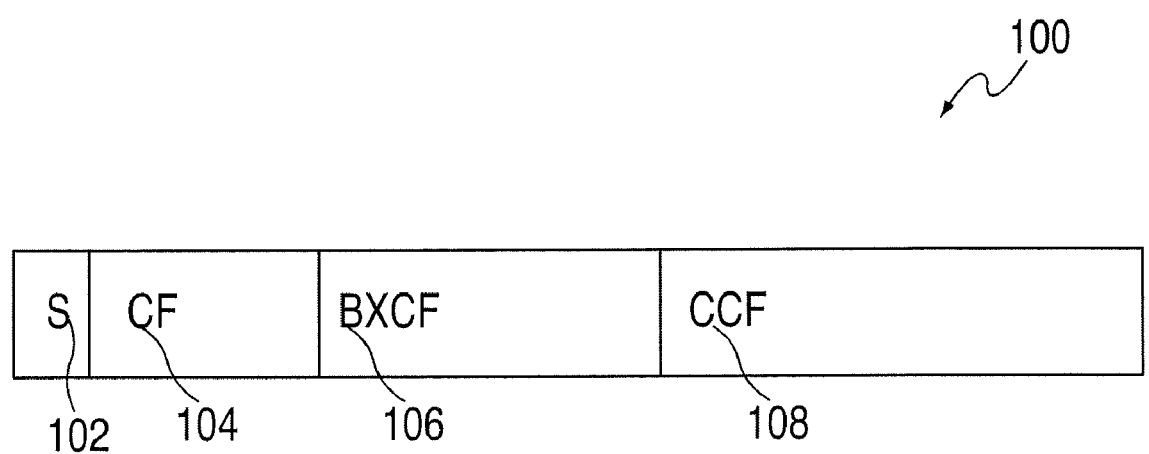
FIG. 1 is an exemplary embodiment of a decimal floating point data representation in a format described in "IBM® z/Architecture Principles of Operation", Chapter 20: Decimal Floating Point Instructions.
Figure 2:
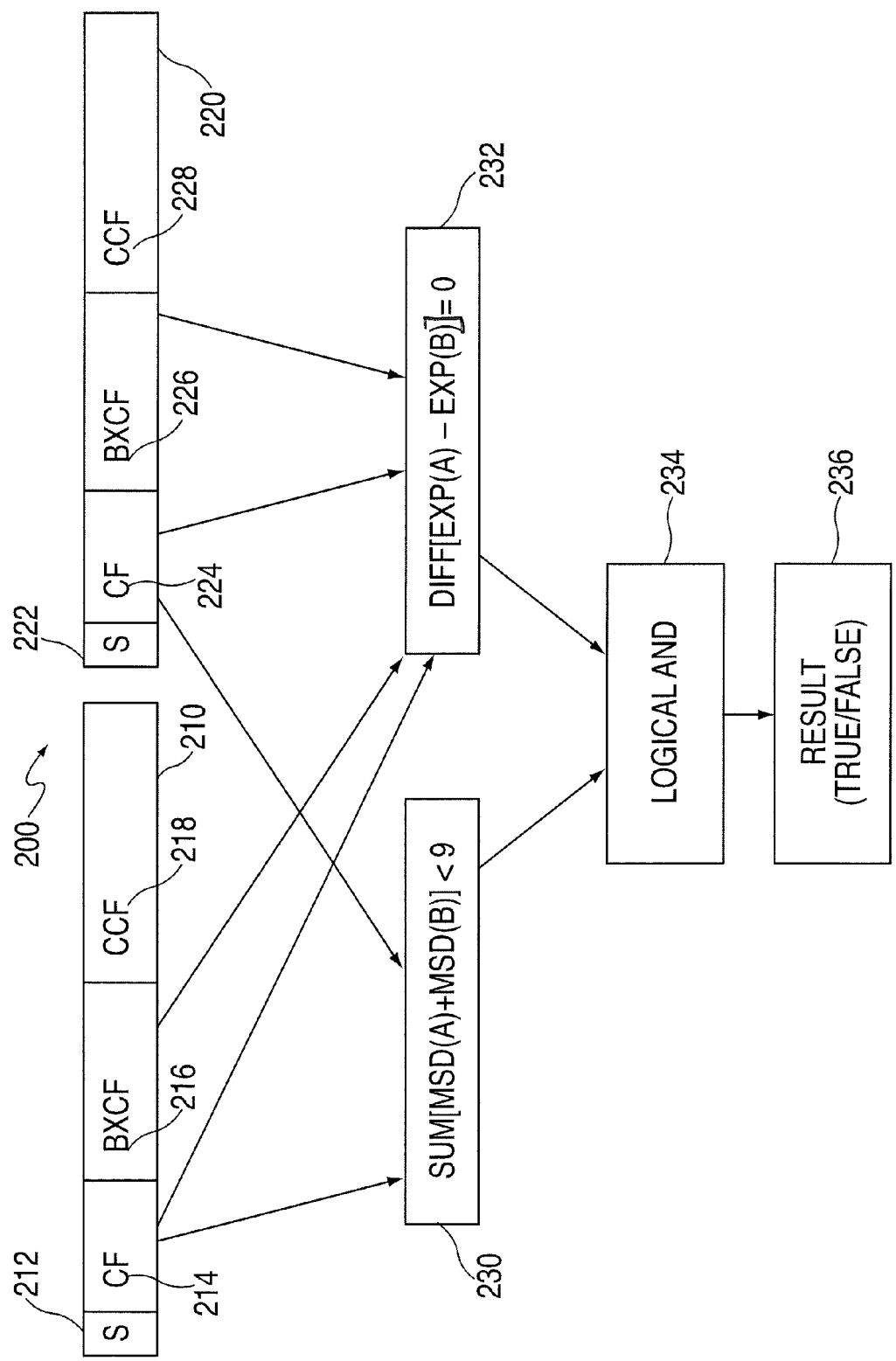
FIG. 2 is a block diagram showing an exemplary embodiment of a method of identifying decimal floating point addition operations that guarantee operand alignment.

FIG. 2 is a diagram 200 that illustrates an exemplary embodiment of a method for identifying decimal floating point addition operations that guarantee operand alignment. The method is described herein as being implemented by a decimal floating point unit (FPU), but may also be manifested in the implementation of a decimal floating point adder, or any other number and configuration of processors.

In a first stage, the FPU, or other processor or hardware, receives data for two addends, i.e., operands. The data includes a first operand 210 (also referred to as "operand A") and a second operand 220 (also referred to as "operand B").

The first operand 210 includes a first sign digit (S) 212, a first combination field (CF) 214, a first biased exponent continuation field (BXCF) 216 and a first coefficient continuation field (CCF) 218. The second operand 220 includes a second sign digit (S) 222, a second combination field (CF) 224, a second biased exponent continuation field (BXCF) 226 and a second coefficient continuation field (CCF) 228.

In a second stage, values of the most significant digit (MSD) and the exponent (EXP) from each of the first operand 210 and the second operand 220 are extracted and decoded. Information from the operands 210 and 220 is passed to two logic blocks for calculation of the MSD and the EXP values.

In one embodiment, information from the first CF 214 and the second CF 224 is passed to a summation logic block 230, which computes the decimal sum of the two MSD values. The summation logic block 230 also computes whether the sum is less than nine (9). This computation may be represented as follows:

$$\text{SUM}[\text{MSD}(A)+\text{MSD}(B)] < 9$$

In parallel, information from the first CF 214, the second CF 224, the first BXCF 216 and the second BXCF 226 is passed to a difference logic block 232, which computes the value of the difference between the two operand's exponents. The difference logic block 232 also computes whether the difference is equal to zero (0). This computation may be represented as follows:

$$\text{DIFF}[\text{EXP}(A)-\text{EXP}(B)]0$$

Even though the operand's exponents are biased when stored in the BXCF 108, a difference of zero is still indicative of a scenario where alignment is guaranteed.

In a third stage, the results from blocks 230 and 232 are passed to an "AND" logical block 234 to determine if both the sum is less than nine and the difference equals zero. If the sum of the most significant digits is less than nine and the exponent difference is equal to zero, i.e., a result 236 of the AND operation is true, then the hardware will know for certain if additional operand alignment, result normalization and setup or completion steps would be required for the addition. Such additional steps would include operand alignment, normalization of the result and rounding.

In a fourth stage, the FPU may then use this information to select the appropriate dataflow paths to ensure quick completion of the additive instruction. In addition, the hardware may also use the identification information to signal an external instruction dispatch unit (IDU). This signal indicates that the FPU will be completing the additive instruction, and that a subsequent instruction can be dispatched.

Knowledge of the operands alone allows the FPU to determine this guaranteed alignment scenario, which subsequently allows for the dispatch of the next instruction sooner, thereby increasing performance, since the most significant digits and exponents are extracted directly from the operands.

Figure 3:
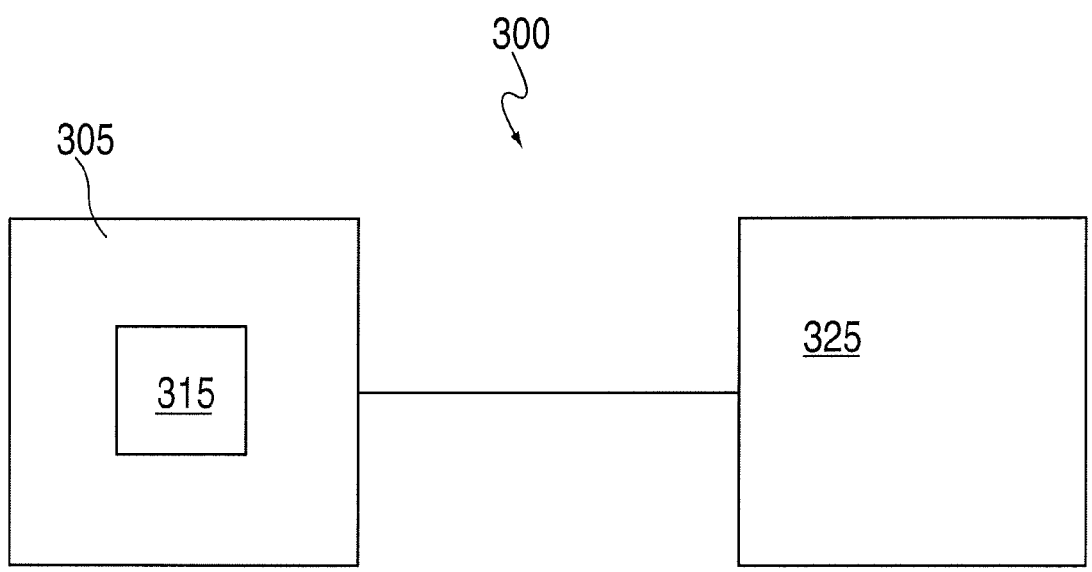
FIG. 3 is an exemplary embodiment of a system for performing methods described herein.

Finally, FIG. 3 depicts a system 300 suitable for implementing the method for identifying decimal floating point addition operations that guarantee operand alignment. The system 300 includes a microprocessor 305 or other processor, such as a FPU or a central processing unit (CPU) which includes a processor function 315 for performing the method.

The system also includes an optional IDU 325 for receiving information from the microprocessor 305 and dispatching instructions to the microprocessor 305. The system 300 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

Technical effects and benefits include increased performance of microprocessors. The method and computer program product described herein uphold the "keep the common case fast" mantra of computer design. Since most additive operations would fall into the first category, in which no operand alignment is needed, and since most additive operations would also produce results well within the prescribed precision, one additional piece of data is introduced to guarantee that no additional checking or normalization steps would be required. This would allow for increased performance on the most common cases.

In prior art methods, as reduced execution latency is desirable for increased performance, one would need to spend cycles trying to determine i) which addition category the operation belongs to, and ii) whether any post-normalization and rounding is necessary. By employing the method and computer program product described herein, an operation with no chance of overflow (the first category described above) can be determined quickly after the value of the operands are known. This would increase overall performance of an addition instruction by optimizing the dataflow for this common category of operations.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of identifying decimal floating point addition operations that guarantee operand alignment and do not require alignment, normalization or rounding, the method comprising:
    receiving an instruction at a processor, from an instruction unit, to perform an addition of a first operand and a second operand; and
    prior to performance of the addition, performing by the processor:
    extracting a first exponent (EXP) and a first most significant digit (MSD) from the first operand;
    extracting a second EXP and a second MSD from the second operand; and
    determining whether the first operand and the second operand are aligned, based on the first EXP, the first MSD, the second EXP and the second MSD, wherein determining includes calculating a sum of the first MSD and the second MSD and calculating a difference between the first EXP and the second EXP, and wherein no additional alignment, normalization or rounding is necessary if the sum is less than nine and if the difference is equal to zero.

2. The method of claim 1, wherein:
    the first operand comprises a first sign digit, a first combination field (CF), a first biased exponent continuation field (BXCF), and a first coefficient continuation field (CCF); and
    the second operand comprises a second sign digit, a second combination field (CF), a second biased exponent continuation field (BXCF), and a second coefficient continuation field (CCF).

3. The method of claim 2, wherein extracting the first EXP comprises extracting the first EXP from the first CF and the first BXCF, and extracting the second EXP comprises extracting the second EXP from the second CF and the second BXCF.

4. The method of claim 2, wherein extracting the first MSD comprises extracting the first MSD from the first CF, and extracting the second MSD comprises extracting the second MSD from the second CF.

5. The method of claim 2, wherein the first MSD is the most significant digit of the first CF, and the second MSD is the most significant digit of the second CF.

6. The method of claim 1, further comprising, based on a result of the determining, sending a signal to an instruction dispatch unit to indicate when the instruction dispatch unit should initiate another instruction.

7. A computer program product for identifying floating point addition operations that guarantee operand alignment and do not require alignment, normalization or rounding, the computer program product comprising:
    a computer-readable storage medium for storing instructions for executing a method comprising:
    receiving an instruction to perform an addition of a first operand and a second operand; and
    prior to performing the addition, performing:
    extracting a first exponent (EXP) and a first most significant digit (MSD) from the first operand;
    extracting a second EXP and a second MSD from the second operand; and
    determining whether the first operand and the second operand are aligned, based on the first EXP, the first MSD, the second EXP and the second MSD, wherein determining includes calculating a sum of the first MSD and the second MSD and calculating a difference between the first EXP and the second EXP, and wherein no additional alignment, normalization or rounding is necessary if the sum is less than nine and if the difference is equal to zero.

8. The computer program product of claim 7, wherein:
the first operand comprises a first sign digit, a first combination field (CF), a first biased exponent continuation field (BXCF), and a first coefficient continuation field (CCF); and
the second operand comprises a second sign digit, a second combination field (CF), a second biased exponent continuation field (BXCF), and a second coefficient continuation field (CCF).

9. The computer program product of claim 8, wherein extracting the first EXP comprises extracting the first EXP from the first CF and the first BXCF, and extracting the second EXP comprises extracting the second EXP from the second CF and the second BXCF.

10. The computer program product of claim 8, wherein extracting the first MSD comprises extracting the first MSD from the first CF, and extracting the second MSD comprises extracting the second MSD from the second CF.

11. The computer program product of claim 8, wherein the first MSD is the most significant digit of the first CF, and the second MSD is the most significant digit of the second CF.

12. The computer program product of claim 7, further comprising, based on a result of the determining, sending a signal to an instruction dispatch unit to indicate when the instruction dispatch unit should initiate another instruction.

13. A system for identifying floating point addition operations that guarantee operand alignment and do not require alignment, normalization or rounding, the system comprising:
an instruction dispatching unit (IDU) for sending an instruction to perform an addition of a first operand and a second operand; and
a processor in operable communication with the IDU, the processor, prior to performance of the addition, performing:
receiving the instruction;
extracting a first exponent (EXP) and a first most significant digit (MSD) from the first operand;
extracting a second EXP and a second MSD from the second operand; and
determining whether the first operand and the second operand are aligned, based on the first EXP, the first MSD, the second EXP and the second MSD, wherein determining includes calculating a sum of the first MSD and the second MSD and calculating a difference between the first EXP and the second EXP, and wherein no additional alignment, normalization or rounding is necessary if the sum is less than nine and if the difference is equal to zero.

14. The system of claim 13, wherein the processor further performs, based on a result of the determining, sending a signal to an instruction dispatch unit to indicate when the instruction dispatch unit should initiate another instruction.

* * * * *